(12) United States Patent
Lai et al.

(10) Patent No.: US 7,947,400 B2
(45) Date of Patent: May 24, 2011

(54) METHOD OF OPERATING A FUEL CELL STACK BY MONITORING MEMBRANE HYDRATION

(75) Inventors: Yeh-Hung Lai, Webster, NY (US);
Pinkhas A. Rapaport, Fairport, NY (US); John C. Fagey, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1318 days.

(21) Appl. No.: 11/464,226

(22) Filed: Aug. 14, 2006

(65) Prior Publication Data

US 2008/0038594 A1 Feb. 14, 2008

(51) Int. Cl.
*H01M 8/04* (2006.01)
*H01M 8/10* (2006.01)

(52) U.S. Cl. ......... 429/428; 429/433; 429/442; 429/483

(58) Field of Classification Search ................. 429/428, 429/433, 442, 483
See application file for complete search history.

(56) References Cited

U.S. PATENT DOCUMENTS

| | | | | |
|---|---|---|---|---|
| 5,682,309 A | * | 10/1997 | Bartusiak et al. | 700/29 |
| 2005/0110453 A1 | * | 5/2005 | Lecky | 320/101 |
| 2005/0150276 A1 | * | 7/2005 | Schultz | 73/73 |

OTHER PUBLICATIONS

Yeh-Hung Lai, Craig S. Gittleman, Cortney K. Mittelsteadt and David A. Dillard, Fuelcell2005-74120—Viscoelastic Stress Model and Mechanical Characterization of Perflurosulfonic Acid (PFSA) Polymer Electrolyte Membranes, The Third International Conference on Fuel Cell Science, Engineering and Technology, May 23-25, 2005.

* cited by examiner

*Primary Examiner* — Dah-Wei D Yuan
*Assistant Examiner* — Edu E Enin-Okut
(74) *Attorney, Agent, or Firm* — Dinsmore & Shohl LLP

(57) ABSTRACT

An electrochemical conversion assembly (10) is provided comprising a plurality of electrochemical conversion cells arranged in a conductively coupled fuel cell stack (20), a condition sensor (30, 40) operatively coupled to the fuel cell stack (20), and a programmable controller operatively coupled to the condition sensor and the fuel cell stack. The condition sensor is configured to measure a rate of change of hydration in the proton exchange membrane and either the condition sensor or the programmable controller is configured to generate a signal indicative of the measured rate of change of hydration. The programmable controller is configured to facilitate control of at least one operating parameter of the electrochemical conversion assembly by monitoring the signal indicative of the measured rate of change of hydration. The condition sensor can be configured to detect a dimensional change or a change in compression of the conductively coupled fuel cell stack as the membrane hydration changes. Additional embodiments are disclosed.

8 Claims, 4 Drawing Sheets

US 7,947,400 B2

METHOD OF OPERATING A FUEL CELL STACK BY MONITORING MEMBRANE HYDRATION

CROSS-REFERENCE TO RELATED APPLICATIONS

The present application is related to U.S. patent application Ser. No. 11/695,270, filed Apr. 2, 2007; Ser. No. 11/467,596, filed Aug. 28, 2006; and Ser. No. 11/466,832, filed Aug. 24, 2006.

BACKGROUND OF THE INVENTION

The present invention relates to electrochemical conversion cells, commonly referred to as fuel cells, which produce electrical energy by processing first and second reactants. For example, electrical energy can be generated in a fuel cell through the reduction of an oxygen-containing gas and the oxidation of a hydrogenous gas. By way of illustration and not limitation, a typical cell comprises a membrane electrode assembly (MEA) positioned between a pair of flowfields accommodating respective ones of the reactants. More specifically, a cathode flowfield plate and an anode flowfield plate can be positioned on opposite sides of the MEA. The voltage provided by a single cell unit is typically too small for useful application so it is common to arrange a plurality of cells in a conductively coupled "stack" to increase the electrical output of the electrochemical conversion assembly.

The membrane electrode assembly typically comprises a proton exchange membrane separating an anode layer and a cathode layer of the MEA. The MEA is typically characterized by enhanced proton conductivity under wet conditions. For the purpose of describing the context of the present invention, it is noted that the general configuration and operation of fuel cells and fuel cell stacks is beyond the scope of the present invention. Rather, the present invention is directed to methods for managing MEA hydration cycling fatigue life in fuel cells. Regarding the general configuration and operation of fuel cells and fuel cell stacks, applicants refer to the vast collection of teachings covering the manner in which fuel cell "stacks" and the various components of the stack are configured. For example, a plurality of U.S. patents and published applications relate directly to fuel cell configurations and corresponding methods of operation. More specifically, FIGS. 1 and 2 of U.S. Patent Application Pub. No. 2005/0058864 and the accompanying text present a detailed illustration of the components of one type of fuel cell stack and this particular subject matter is expressly incorporated herein by reference.

BRIEF SUMMARY OF THE INVENTION

The durability of a fuel cell utilizing a hydrated MEA strongly depends on the hydration status of the polymer electrolyte membrane used in the MEA. To reduce the resistance of proton conductivity in the membrane, it is normally desired to keep the polymer electrolyte membrane sufficiently hydrated. However, the present inventors have recognized that under typical operating conditions the MEA cycles through relatively wet and relatively dry states. These membrane hydration cycles are particularly prevalent during fuel cell start-up and shut-down operations and as power demand fluctuates during operation of the fuel cell.

One of the consequences of the aforementioned hydration cycling is significant degradation of the mechanical durability of the MEA. More specifically, the fatigue cycle life of a MEA is directly related to membrane stress. In turn, membrane stress is a strong function of water content, dehydration rate, temperature, and heating/cooling rate. The relationship between membrane stress and fatigue life can be represented using a fatigue life curve, which is also referred to herein as an S-N curve. According to the S-N curve, an example of which is illustrated in FIG. 1, normalized membrane stress, i.e., stress normalized with respect to the stress of a cell with a life of 4000 cycles, is plotted versus membrane life for a variety of different test conditions and where membrane life is defined as the number of cycles to leak initiation, higher membrane stresses generally correspond to lower fuel cell durability. It should be noted that alternate fatigue curves can be obtained by choosing different failure criterion. For example, instead of leak initiation, one may use a 0.2 sccm leak rated as a failure criterion.

The present inventor has recognized that membrane stress can be minimized by properly controlling variables like membrane hydration and dehydration rates, water content, temperature, and heating/cooling rate. By minimizing membrane stress, the membrane fatigue life can be prolonged. According to one aspect of the present invention, a fatigue life contour map is created based on a suitable S-N curve and a suitable membrane stress model or some other suitable means for calculating membrane stresses for a given dehydration rate, water content, temperature, and starting water content when dehydration takes place. It is contemplated that suitable S-N curves should correspond closely to the membrane at issue and may be determined experimentally or approximated based on available membrane data.

An example of a suitable membrane stress model follows:

$$\varepsilon_{ij}(\sigma, t, T, \lambda) = \frac{\delta_{ij}}{3} B \cdot s + \frac{3}{2} \int_0^t D(t-\xi) \dot{s}_{ij}(\xi) d\xi + \delta_{ij} \beta \cdot \Delta\lambda$$

where values for the membrane hydration $\lambda$, change in membrane hydration $\Delta\lambda$, the membrane temperature T, the coefficient of hygro expansion $\beta$, and the uniaxial creep compliance D are input from material tests and fuel cell system tests, and where $\lambda$, $\Delta\lambda$ represent the water content of the membrane in terms of the number of water molecules per acid site with an unit of $H_2O/H^+$, $\epsilon_{ij}$ is a strain tensor, $\sigma$ represents stress, t represents time, $\delta_{ij}$ is the Kronecker delta, B is the bulk creep compliance, s is the dilatational component of the applied stress, $s_{ij}$ is the deviatoric component of the applied stress, and $\xi$ is an integration variable representing time. The particulars of this membrane stress model are beyond the scope of the present invention and can be gleaned from a variety of suitable teachings on stress modeling. The model is presented here merely for illustrative purposes and should not be used to limit the scope of the present invention.

A fatigue life contour map, an example of which is illustrated in FIG. 2, can be constructed using the S-N life curve and a calculated, measured, approximated or otherwise determined membrane stress. Once the contour map is created, one can then determine the best path for dehydrating the membrane to a predetermined, preferred, or other suitable water content value by selecting a path that satisfies predetermined fatigue life conditions, as defined by the contour ranges of the contour map. Optimal dehydration paths are typically those that are characterized by a relatively high fatigue life. It is further noted that a series of fatigue life contour maps at various temperatures can be created. In this manner, one can transition at a certain water content point from one temperature to another by transferring from a contour map at one temperature to a contour map established for another temperature. One can then follow an optimal dehydration path using the contour map for the new temperature.

It is contemplated that the membrane can be dehydrated in any suitable manner. For example, and not by way of limitation, it is contemplated the membrane can be dehydrated by controlling the temperature of the membrane, the humidity in the cathode and anode flowfields, the flow rates and gas pressures in the respective cathode and anode flowfields.

In accordance with one embodiment of the present invention, a method of operating an electrochemical conversion assembly is provided, the method comprising the steps of measuring a rate of change of hydration in the proton exchange membrane, generating a signal indicative of the measured rate of change of hydration, and controlling at least one operating parameter of the electrochemical conversion assembly by monitoring the signal indicative of the measured rate of change of hydration.

In accordance with another embodiment of the present invention, a method of operating an electrochemical conversion assembly is provided, the method comprising the steps of: (i) measuring a rate of change of hydration in the proton exchange membrane by detecting a dimensional change of the conductively coupled fuel cell stack as the membrane hydration changes or by detecting a change in compression of the conductively coupled fuel cell stack as the membrane hydration changes; (ii) generating a signal indicative of the measured rate of change of hydration; and (iii) controlling membrane hydration of the electrochemical conversion assembly by dehydrating the proton exchange membrane while monitoring the signal indicative of the measured rate of change of hydration.

In accordance with yet another embodiment of the present invention, an electrochemical conversion assembly is provided comprising a plurality of electrochemical conversion cells arranged in a conductively coupled fuel cell stack, a condition sensor operatively coupled to the fuel cell stack, and a programmable controller operatively coupled to the condition sensor and the fuel cell stack. The condition sensor is configured to measure a rate of change of hydration in the proton exchange membrane and either the condition sensor or the programmable controller is configured to generate a signal indicative of the measured rate of change of hydration. The programmable controller is configured to facilitate control of at least one operating parameter of the electrochemical conversion assembly by monitoring the signal indicative of the measured rate of change of hydration. The condition sensor can be configured to detect a dimensional change or a change in compression of the conductively coupled fuel cell stack as the membrane hydration changes.

Accordingly, it is an object of the present invention to enhance the durability of a fuel cell utilizing a hydrated MEA. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 2:
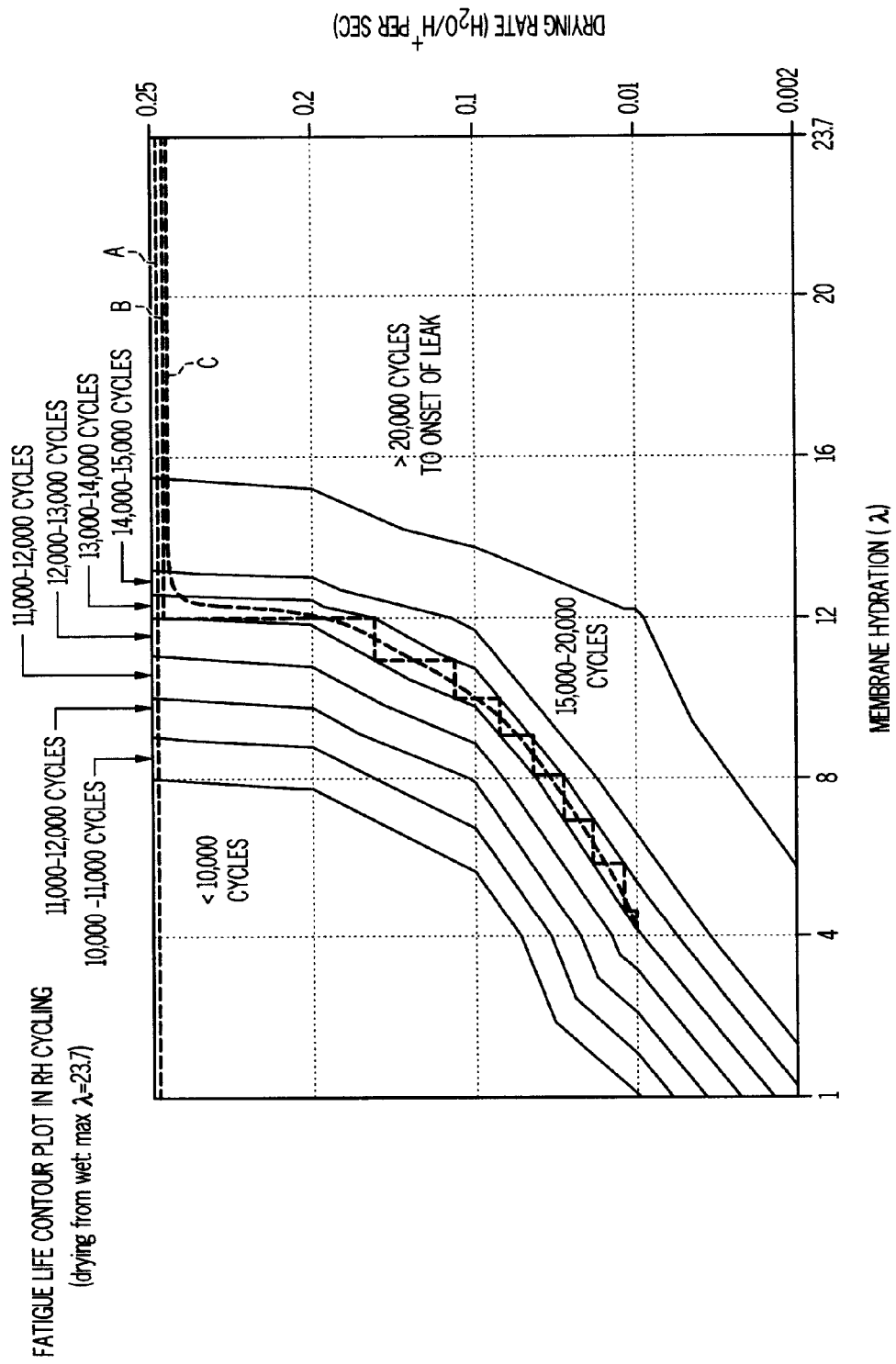
FIG. 2 is an illustration of a fatigue life contour map according to the present invention.
Figure 3:
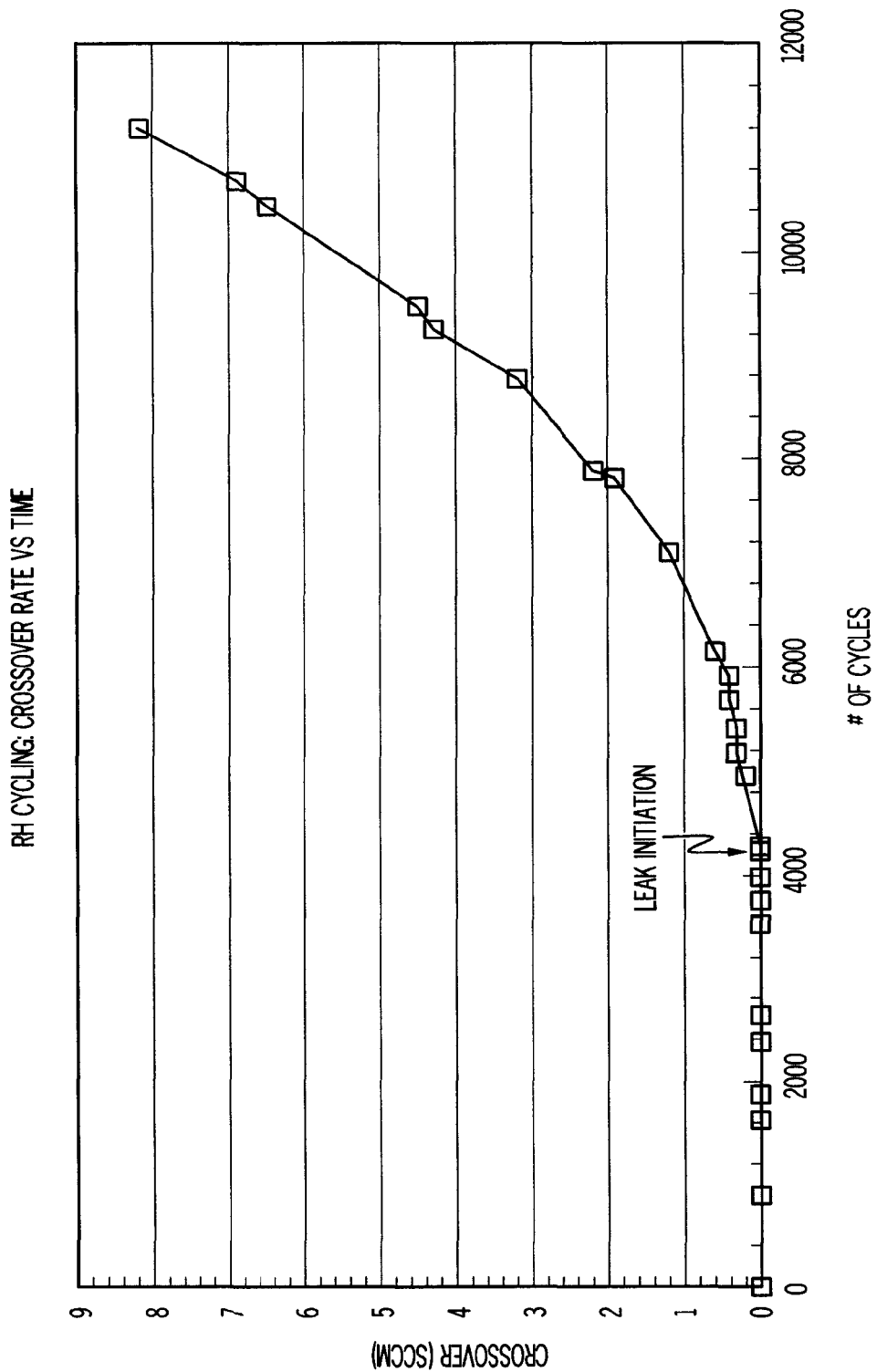
FIG. 3 is a graphical illustration of reactant leak rate across a proton exchange membrane in an electrochemical conversion cell.

The details of the present invention can be illustrated in further detail by referring to the particular fatigue life contour map illustrated in FIG. 2 and taking, as an example, a particular application that requires the need to decrease the water content of the proton exchange membrane from a relatively wet condition, $\lambda=23.7$, to a dryer condition of $\lambda=4$, at a temperature of about 80° C. For comparative purposes, the fatigue life cycle for dehydration along path A at a substantially constant rate of about $0.25 H_2O/H^+$ per second would result in a fatigue life of about 6000-7000 cycles. According to the methodology of the present invention, referring to dehydration along path B, the membrane is initially dehydrated at a rate of about $H_2O/H^+$ per second until the membrane hydration $\lambda$ reaches a value where the expected fatigue life would fall below an acceptable level, e.g., <13,000 cycles to leak initiation. To stay within an optimal or acceptable fatigue life cycle value, the dehydration rate is intermittently or continuously reduced while keeping the dehydration path within the acceptable fatigue life cycle range, e.g., >13000, until the targeted water content $\lambda=4$ is reached. In this embodiment of the present invention, the expected fatigue life cycle would likely fall between 13000 and 14000 cycles, a significant improvement over the above-noted fatigue life of about 6000-7000 cycles. The dehydration rate is illustrated in a stepped nature in FIG. 2 to simplify the discussion of the present invention. However, it is noted that a less intermittent reduction of the dehydration rate within the specific contour path illustrated in FIG. 2 is likely to result in further improvements in expected fatigue life.

Accordingly, the methodology of the present invention calls for the initiation of a membrane dehydration sequence at an initial membrane hydration $\lambda_{WET}$ and maintenance of the dehydration sequence until the membrane is characterized by a target membrane hydration $\lambda_{DRY}$. It is contemplated that the dehydration sequence of the present invention need not be initiated when the membrane hydration is at a maximum value or terminated when the membrane hydration is at a minimum value. Rather, the sequence may be initiated at any point in the life cycle of the membrane where controlled membrane dehydration is desirable and terminated at any point where controlled membrane dehydration is no longer required or desired. In any event, the initial membrane hydration $\lambda_{WET}$ is substantially larger than the target membrane hydration $\lambda_{DRY}$. Generally, target membrane hydrations $\lambda_{DRY}$ are often below about $\lambda=8$, where $\lambda$ represents the water content of the membrane in terms of the number of water molecules per acid site. It is contemplated that initial and target membrane hydrations will vary significantly depending upon the particular context in which the present invention is to be employed.

It is contemplated that the membrane can be dehydrated in any suitable manner, including, but not limited to, dehydration through control of the temperature of the membrane, the humidity in the first reactant flowfield, the humidity in the second reactant flowfield, the flow rate in the first reactant flowfield, the flow rate in the second reactant flowfield, the gas pressure in the first reactant flowfield, and/or the gas pressure in the second reactant flowfield.

Figure 1:
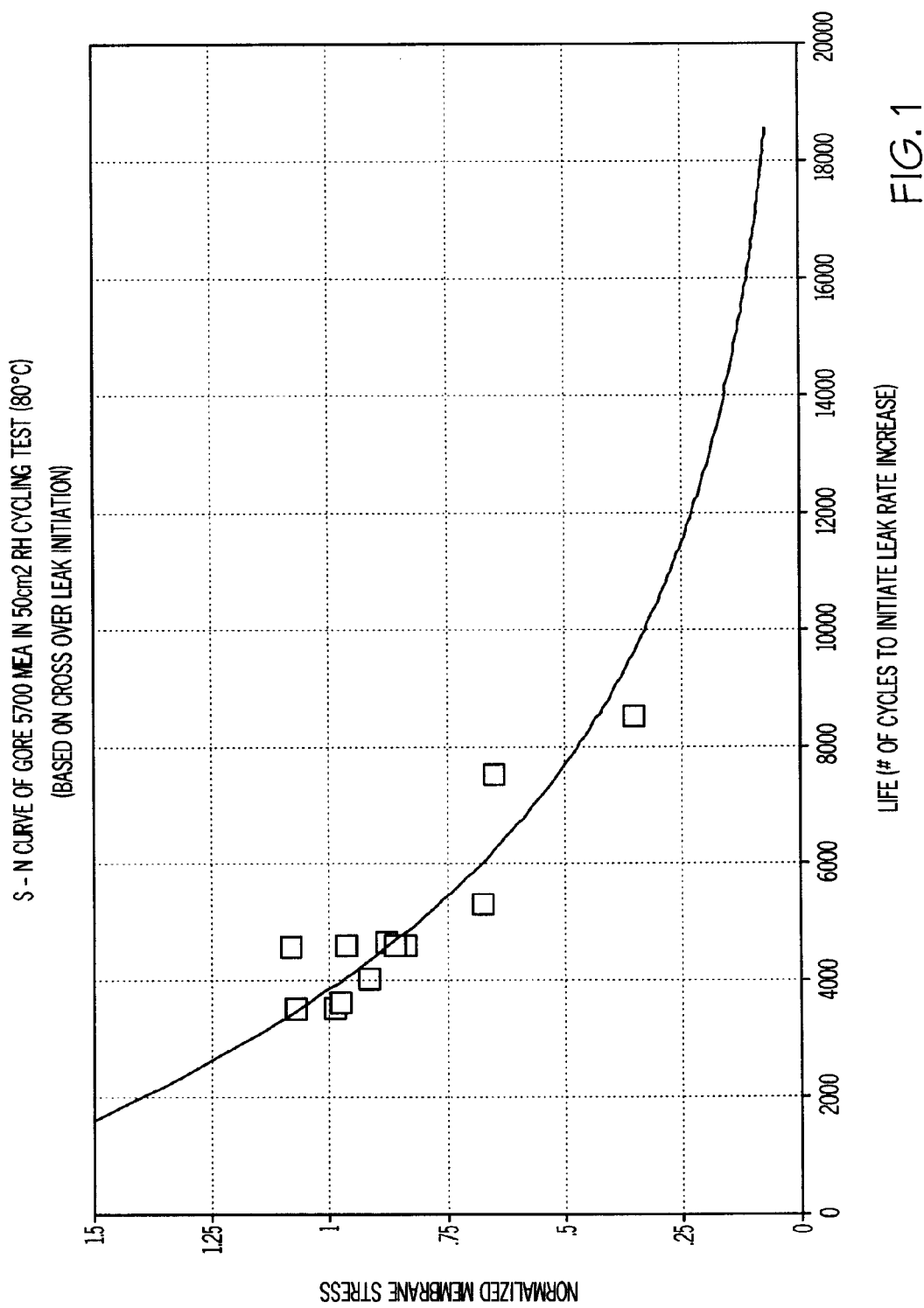
FIG. 1 is an illustration of a fatigue life curve, also referred to herein as an S-N curve, showing the relationship between membrane stress and fatigue life.

The dehydration sequence is characterized by a drying rate that varies in a manner that substantially corresponds to a fatigue life contour map of the membrane, an example of which is illustrated in FIG. 2, discussed above. More specifically, a fatigue life contour map of the membrane can be constructed using a fatigue life curve of the membrane and a calculated, measured, approximated or otherwise determined membrane stress. The fatigue life curve used to construct the map, an example of which is illustrated in FIG. 1 discussed above, typically comprises a plot representative of points at which a substantial increase in the leak rate of reactants across the membrane is initiated. It is noted, however, that a variety of alternative means may be utilized to measure fatigue life. For example, instead of referring to the point at which there is a substantial increase in the leak rate across the membrane, one could refer to the point at which the leak rate exceeds a given value, such as 0.2 sccm/cm$^2$ of MEA active area. It is noted that leak rate can be determined in a variety of ways, as would be recognized by those or ordinary skill in the art of fuel cell design. For example, and not by way of limitation, leak rates can be determined by physically measuring gas leak flow rate or pressure drop or by measuring crossover current, open circuit voltage decay time, etc. In any event, the fatigue life curve illustrated in FIG. 1 was created by monitoring leak initiation for a membrane of interest over a variety of operating conditions and plotting various points of leak initiation as a function of a calculated or otherwise determined membrane stress and the number of hydration cycles prior to leak initiation. The membrane stress used to create the fatigue life contour map can be determined in a variety of ways. For example, the membrane stress can be determined by using the above-described membrane stress model to represent the particular membrane and operating conditions of interest.

Regardless of how fatigue life contour maps according to the present invention are created, the dehydration rate is controlled such that it tracks particular contours within the fatigue life contour map. For example, the dehydration sequence can be controlled such that it tracks only those contours within the map that are characterized by an expected cycle life value that exceeds about 6,000 cycles. In the embodiment of the present invention illustrated in FIG. 2, referring to dehydration path B presented in the graph, the dehydration sequence is controlled such that it tracks only those contours within the map that are characterized by a life cycle of above about 13,000 cycles. In general, the dehydration sequence of path B is characterized by a drying rate that decreases as membrane hydration approaches the target membrane hydration $\lambda_{DRY}$. The drying rate is illustrated in FIG. 2 as decreasing in a substantially intermittent manner but it is noted that the drying rate can decrease continuously (see path C), intermittently, or continuously and intermittently, in a uniform or non-uniform manner. Further, as is illustrated in FIG. 2, dehydration sequences according to the present invention may include periods of substantially constant, non-decreasing drying rate.

Referring further to FIG. 2 and comparing relatively constant dehydration path A with path B, described above, it is noted that the dehydration sequence represented in path B is characterized by an expected life cycle that greatly exceeds the expected cycle life associated with the substantially constant dehydration rate of path A, which is above about 0.125 $H_2O/H^+$ per second. Of course, the substantially constant dehydration rate of 0.125 $H_2O/H^+$ per second is presented here for illustrative puposes only and should not be taken to limit the scope of the invention beyond that which is defined in the appended claims. For illustrative purposes, it is noted that a life cycle life value may be selected such that it represents a point at which a substantial increase in the leak rate of reactants across the membrane is initiated. A cycle represents humidification cycling of the membrane from a relatively hydrated state, to a relatively dehydrated state, and back to the relatively hydrated state.

According to one embodiment of the present invention, it is contemplated that effective dehydration sequences may also be configured without reference to a fatigue life contour map by merely controlling the dehydration sequence such that the drying rate decreases gradually or intermittently as the membrane hydration approaches the target membrane hydration $\lambda_{DRY}$.

According to another embodiment of the present invention, the electrochemical conversion cell is provided with a cell controller that is programmed to initiate and maintain the membrane dehydration sequence until the membrane is characterized by a target membrane hydration $\lambda_{DRY}$. In this light, it is noted that the membrane dehydration sequence can be initiated upon detection of a trigger signal that represents of a particular operating condition of the electrochemical conversion cell. For example, it is contemplated that the trigger signal can represent the water content of the membrane such that dehydration is initiated when the water content reaches a maximum value or exceeds a predetermined threshold value. Alternatively, the trigger signal may represent the relative humidity in the reactant flowfield, the present power demand on the cell, the initiation or termination of a shut-down or start-up sequence in the cell, the completion of a hydration cycle of the cell, or combinations thereof.

In addition, it is contemplated that the dehydration sequence can be terminated upon detection of a termination signal representative of an operating condition of the electrochemical conversion cell. The termination signal can represent the water content of the membrane, the relative humidity in the reactant flowfield, power demand on the cell, the initiation or termination of a shut-down or start-up sequence in the cell, the completion of a dehydration cycle of the cell, or combinations thereof.

Figure 4:
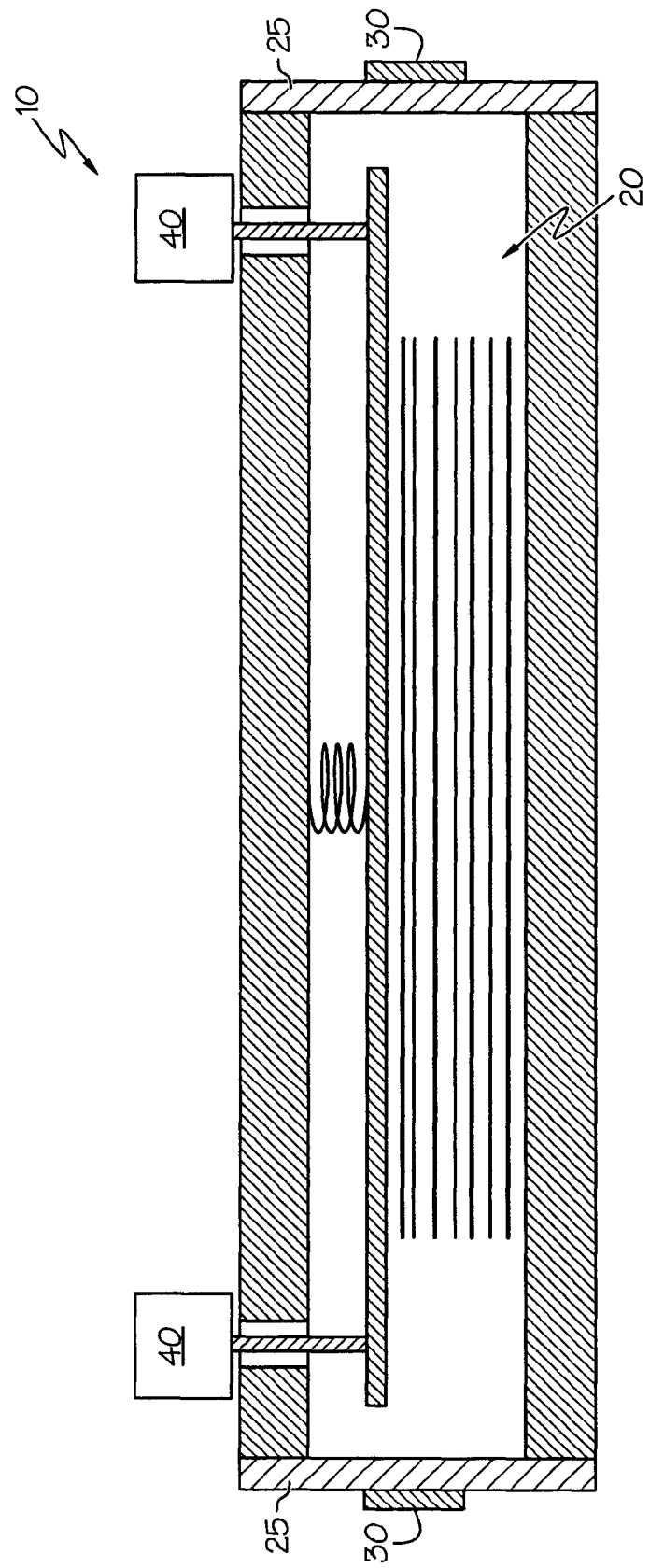
FIG. 4 is a schematic illustration of an electrochemical conversion assembly according to the present invention.

According to another aspect of the present invention, the membrane dehydration sequence described above, or any other membrane hydration control scheme, is controlled by monitoring a parameter indicative of the rate of change of membrane hydration. Specifically, referring to FIG. 4, this aspect of the present invention can be described in the context of an electrochemical conversion assembly 10 comprising a plurality of electrochemical conversion cells arranged in a conductively coupled fuel cell stack 20. As is noted above, respective ones of the cells comprise membrane electrode assemblies positioned between first and second reactant flowfields. The membrane electrode assemblies comprise respective proton exchange membranes.

According to the method, a signal indicative of the measured rate of change of hydration is generated by measuring the rate of change of hydration in the proton exchange membrane. This generated signal, which is indicative of the measured rate of change of hydration, is then used to control one or more operating parameters of the electrochemical conversion assembly. Specifically, in one embodiment of the present invention, the rate of change of membrane hydration is measured by detecting a dimensional change of the conductively coupled fuel cell stack as the membrane hydration changes. A signal indicative of the measured rate of change of hydration can be generated by correlating the dimensional change with a value selected from a set of predetermined rate of change values. For example, the signal may be generated from a lookup table or other index that correlates predetermined thickness changes in the fuel cell stack with predetermined rates of change of hydration.

By way of illustration, it is noted that the thickness dimension of a fuel cell stack can be monitored by any suitable conventional or yet to be developed means including, but not limited to, a linear variable displacement transducer, an extensometer, a strain gauge, an optical interferometer, etc. In the illustrated embodiment, strain gauges 30 mounted to the side plates 25 of the fuel cell stack 20 are configured to detect changes in thickness of the fuel cell stack 20. In addition, linear variable displacement transducers 40 may be configured to monitor dimensional changes within the fuel cell stack 20.

According to another embodiment of the present invention, a signal indicative of the measured rate of change of hydration is generated by detecting a change in compression of the conductively coupled fuel cell stack as the membrane hydration changes. This aspect of the present invention is particularly well suited for fuel cell stacks that are constructed to limit changes in the thickness of the stack. As is noted above with respect to the use of dimensional changes in the stack, this embodiment of the present invention may also entail correlation of the change in compression with a value selected from a set of predetermined rate of change values. It is contemplated that compression in the fuel cell stack may be measured by any suitable conventional or yet to be developed means including, but not limited to, load cells, compression cells. In the illustrated embodiment, the linear variable displacement transducers 40 described above can be replaced with load cells or other devices configured to detect changes in compression of the fuel cell stack 20.

It is contemplated that it may be advantageous to dehydrate the proton exchange membrane while monitoring the signal indicative of the measured rate of change of hydration. For example, a target dehydration rate can be established for all or any part of a particular membrane dehydration sequence and this target rate can be validated by monitoring the signal that is indicative of the measured rate of change of hydration in the membrane. This validation can be effectuated in any of a variety of suitable manners including, but not limited to, the use of an electronic feedback control loop.

As we note above, a variety of fuel cell stack operating parameters can be controlled as a function of, or with reference to, the rate at which hydration in the proton exchange membrane changes. For example, it is contemplated that membrane hydration, fuel cell stack temperature, relative humidity in reactant feed, reactant feed flow rates, reactant feed pressure, fuel cell stack electrical load, or combinations thereof, can be controlled as a function of, or with reference to, the rate at which hydration in the proton exchange membrane changes. Regardless of the particular fuel cell stack operating parameter to be controlled, it is contemplated that one or more target values at which the particular operating parameter is to be controlled can be established and validated by comparing the target value with the generated signal. Further, it is noted that the operating parameter can be controlled without reference to a value representing an actual degree of hydration in the proton exchange membrane because this aspect of the present invention merely relies upon the rate at which the hydration changes, as opposed to the actual hydration value. Accordingly, long term changes in the compression or thickness of the fuel cell stack at particular hydration values need not be accounted for because there is no significant reliance upon the absolute value of the compression or hydration in the stack.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of operating an electrochemical conversion assembly comprising a plurality of electrochemical conversion cells arranged in a conductively coupled fuel cell stack, wherein respective ones of said cells comprise membrane electrode assemblies positioned between first and second reactant flowfields and said membrane electrode assemblies comprise a proton exchange membrane, said method comprising:

measuring a rate of change of hydration in said proton exchange membrane;

generating a signal indicative of said measured rate of change of hydration;

controlling at least one operating parameter of said electrochemical conversion assembly by monitoring said signal indicative of said measured rate of change of hydration, wherein said operating parameter comprises membrane hydration; and dehydrating said proton exchange membrane while monitoring said signal indicative of said measured rate of change of hydration.

2. A method of operating an electrochemical conversion assembly as claimed in claim 1 wherein a target rate at which said membrane is dehydrated is validated by monitoring said signal indicative of said measured rate of change of hydration.

3. A method of operating an electrochemical conversion assembly as claimed in claim 2 wherein said validation is effectuated through the use of an electronic feedback control loop.

4. A method of operating an electrochemical conversion assembly as claimed in claim 1 wherein a target value at which said operating parameter is controlled is validated by comparing said target value with said generated signal.

5. A method of operating an electrochemical conversion assembly as claimed in claim 4 wherein said validation is effectuated through the use of an electronic feedback control loop.

6. A method of operating an electrochemical conversion assembly as claimed in claim 1 wherein said measuring, generating, and controlling steps are facilitated through the use of an electronic programmable controller.

7. A method of operating an electrochemical conversion assembly comprising a plurality of electrochemical conversion cells arranged in a conductively coupled fuel cell stack, wherein respective ones of said cells comprise membrane electrode assemblies positioned between first and second reactant flowfields and said membrane electrode assemblies comprise a proton exchange membrane, said method comprising:

measuring a rate of change of hydration in said proton exchange membrane;

generating a signal indicative of said measured rate of change of hydration;

controlling at least one operating parameter of said electrochemical conversion assembly by monitoring said signal indicative of said measured rate of change of hydration, wherein said operating parameter comprises membrane hydration;

initiating a membrane dehydration sequence when said membrane is characterized by an initial membrane hydration $\lambda_{WET}$; and maintaining said membrane dehydration sequence until said membrane is characterized by a target membrane hydration $\lambda_{DRY}$, wherein said dehydration sequence is maintained while monitoring said signal indicative of said measured rate of change of hydration.

8. A method of operating an electrochemical conversion assembly as claimed in claim 2 wherein said membrane dehydration sequence is characterized by a drying rate that varies in a manner which substantially corresponds to a fatigue life contour map of said membrane.

* * * * *